United States Patent [19]

Pogoda

[11] 4,250,219

[45] Feb. 10, 1981

[54] LACQUER COATING, ESPECIALLY ON METAL SURFACES

[75] Inventor: Dieter Pogoda, Hamburg, Fed. Rep. of Germany

[73] Assignee: Messerschmitt-Boelkow-Blohm GmbH, Munich, Fed. Rep. of Germany

[21] Appl. No.: 680,903

[22] Filed: Apr. 28, 1976

[30] Foreign Application Priority Data

May 2, 1975 [DE] Fed. Rep. of Germany ....... 2519559

[51] Int. Cl.[3] ...................... B32B 15/08; B32B 27/04; B32B 27/08; B32B 27/06

[52] U.S. Cl. .................................. 428/212; 148/31.5; 428/423.5

[58] Field of Search ............... 427/140, 142, 154, 156, 427/409, 410; 428/416, 212, 423.5; 148/31.5

[56] References Cited

U.S. PATENT DOCUMENTS

| | | | |
|---|---|---|---|
| 3,544,349 | 12/1970 | Isaksen et al. | 427/156 |
| 3,625,742 | 12/1971 | Baldwin | 427/416 |

*Primary Examiner*—James R. Hoffman
*Attorney, Agent, or Firm*—W. G. Fasse; W. W. Roberts

[57] ABSTRACT

This protective coating, especially for aircraft bodies and the like, has one or more primer layers and one or more top coat layers, as well as an intermediate layer which is easily dissolved. The intermediate layer protects the primer when the top coat is removed for a new paint job.

9 Claims, 1 Drawing Figure

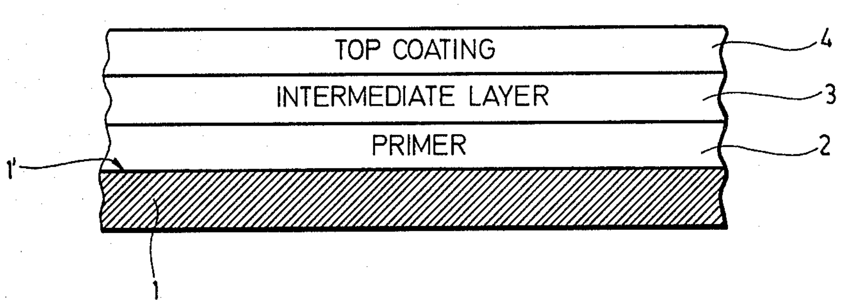
TOP COATING
INTERMEDIATE LAYER
PRIMER
4
3
2
1'
1

LACQUER COATING, ESPECIALLY ON METAL SURFACES

BACKGROUND OF THE INVENTION

The present invention relates to lacquer coatings, especially on metal surfaces, such as aircraft bodies or the like. However, the invention can also be used on non-metal surfaces and the coating comprises several layers in such a manner that at least one primer coating and one cover or finish coating is employed.

The outer lacquer coating on an aircraft is normally applied after the final assembly. Conventionally, a so called wash primer is applied along with a top coating of lacquer or paint. It is also known to use one or several primer coatings between the wash primer and the top coating. Aircrafts are generally repainted after several years, either to improve their appearance or to change their appearance.

Heretofore, it was necessary to completely remove the previous paint and primer down to the bare metal surface prior to a new paint job. A mere removal of the top coating is not possible in connection with prior art paints and lacquers. Due to the paint removal heretofore required, it is normally unavoidable that the original metal surface treatment is damaged or even completely destroyed, whereby the corrosion protection afforded by the second lacquer coating or paint job is substantially diminished, especially since the so called filiform-corrosion can be much more effective where the original metal treatment is penetrated or completely removed. Further, it is required that the paint job on modern commercial aircraft is resistant to non-combustible hydraulic fluids. Such hydraulic fluids usually comprise sulphuric acid esters and the so called wash primer is not resistant or proof against such esters whereby mechanically damaged lacquer layers may also be damaged due to a creeping action.

The application of a primer which is resistant against sulphuric acid esters on the individual components of the aircraft would have the great advantage that an intimate bond would be achieved between the primer and the metal surface. This method would also permit the heat treatment of the primer directly on the individual components. In addition, it would be possible to achieve the best metal surface treatment for each individual component whereby a good bond could be achieved between the top coating and the primer. This good bond in turn would substantially eliminate the so called filiform-corrosion. Moreover, corrosion due to creeping action at points where sheet metal sections overlap each other or along edges and abutments would be almost completely eliminated. Aircraft manufactured in this manner could be painted with the sulphuric acid ester resistant top coat or lacquer after the final assembly. However, such method of applying the paint coating by priming each individual part separately would prevent the removal of the paint coating, even after several years. Even the use of etching means, such as phenol and cresol containing etching means which are very toxic and hence undesirable from an environmental protection point of view would not be suitable to completely remove such a paint system. Furthermore, the removal by sanding is not only uneconomical, it also destroyes the metal surface treatment, such as yellow chromizing or anodizing. Another disadvantage of removing old paint coatings by sanding is seen in that the plating itself could be sanded through.

OBJECTS OF THE INVENTION

In view of the foregoing, it is the aim of the invention to achieve the following objects, singly or in combination:

- to remove the drawbacks of the prior art as described above, especially it is intended to provide a top coating lacquer layer which is easily removed prior to a second paint job without damaging the original priming;
- to provide an intermediate layer between the primer and the top coat which is inert against any etching means which might be used for removing the top coat;
- to employ an intermediate layer of such a nature that the solvents used for removing the intermediate layer will not attack the primer coat; and
- to ensure an intimate long lasting bond between the intermediate layer and the primer coat on the one hand and the intermediate layer and the top coat on the other hand.

SUMMARY OF THE INVENTION

According to the invention there is provided a paint coating for metal and non-metal surfaces which is characterized by an intermediate layer between the primer coating and the top coating which permits the removal of the top coating only and which provides protection for the primer and/or for the painted surface itself.

According to a preferred embodiment, the present paint coating would comprise a so called bonding primer as well as a polyurethane primer applied to an anodized or chromized surface such as of the body of an aircraft or the like. On top of this double primer, there would be applied the intermediate layer, for example, by spraying a non-cross-linked polyamide. The top coating could then be a polyurethane lacquer.

BRIEF FIGURE DESCRIPTION

In order that the invention may be clearly understood, it will now be described, by way of example, with reference to the single FIGURE, which illustrates a sectional view through one example of a paint job according to the invention.

DETAILED DESCRIPTION OF EXAMPLE EMBODIMENTS:

The material 1, such as sheet metal or the like, is to be painted. The surface 1' of the sheet material 1 may be pre-treated for example, by anodizing or the like as is well known in the art. Layer 2 is a primer which may, for example, be a double primer including a bonding primer and a polyurethane primer. This primer is preferably applied individually on each component part. The intermediate layer 3, according to the invention, is a material which is inert against any solvent for a later removing of the top coating. Such intermediate inert layer may, for example, be a non-cross-linked polyamide. Layer 4 represents the top coating, which may be a lacquer such as a polyurethane lacquer. The thickness of the layers shown is rather exaggerated.

According to the invention, the second paint job is performed as follows: Only the top layer or coating 4 is removed, preferably with an etchant that is not objectionable from an environmental point of view. The intermediate layer 3 facilitates the removal of the top coating, because it prevents a penetration of the etchant into the primer 2.

After removal of the top coating 4, the intermediate layer 3 may also be removed if desired, for example, with a solvent such as an alcohol. The original primer is thus not affected at all and its good bond to the surface 1' remains assured even after the application of the second paint job. This feature of the invention has the advantage that time and costs are saved which is especially important with aircraft, the down-time of which should be minimized.

If the intermediate layer 3 should have been removed, a new intermediate layer will be applied to completely cover the primer. This completely covering may be facilitated by using a color in the intermediate layer 3 which differs from the color of the primer in a well visible manner. Another advantage of distinctly coloring the intermediate layer is seen in that the subsequent spraying of the intermediate layer is easy to check at a later time. Thereafter, a new top coating, such as a polyurethane lacquer is applied. Such a lacquer has a good chemical resistivity as well as a good bond to the intermediate layer 3. In spite of this bond and surprisingly, it is relatively easy and hence economical to remove the top coating at a later time, if necessary.

Summarizing, advantages of the invention are seen that it facilitates not only the second paint job, even if it involves several layers of paints, but also that it provides a high quality underpaint which is not removed by the work necessary for the second paint job. This is especially important in connection with metal surfaces, because the pretreatment steps which are necessary prior to a second paint job do not change in any way the quallity of the original primer job and do not damage any surface treatment.

A specific example of the invention would involve the following steps: The individual component element is yellow chromatized and a primer coat is applied prior to any assembly. Still prior to assemblying, a bonding primer and a base primer are applied in that order, whereby a heat treatment may also be involved. Thereafter, the individual elements are mounted and subsequent to the final assembly of the aircraft or the like, the following steps are performed: Light sanding and cleaning of the base primer, spraying of an intermediate layer of lacquer or the like and thereafter spraying with the top coating lacquer. When later a second paint job is required, the top coating is removed, preferably with an etchant not objectionable from an environmental point of view. The following etchants would be suitable: DO 317 or N 53509 produced by the Wiederhold Company; Herbol FL 7040 produced by BASF-Lackchemie could also be used. Other etchants such as Titanine Nr. 20 of the company Titanine Ltd. or Scalpex G5 of the company S.C.A.L.P. would also be suitable.. After the etching or pickling of the top layer lacquer, the intermediate layer is removed by means of an alcohol solvent, such as N 38734, whereby the base primer is again exposed. Thereafter, said intermediate layer and a top layer will be sprayed.

Although the invention has been described with reference to specific example embodiments, it is to be understood, that it is intended to cover all modifications and equivalents within the scope of the appended claims.

In the following explanations are submitted to the terms used above.

1. Chromatized

With reference hereto, it is stated inter alia in F. Toedt: "Kerrosion und Korrosionsschutz" (Corrosion and Protection against Corrosion), Publisher: Walter de Gruyter, Berlin 1961 at page 539 as follows:

In the chromation process it is chiefly a question of immersion baths containing chromic acid or dichromate with an acid. A greenish-yellow layer of a basic chromate having a thickness of approximately 0.5–1 $\mu m$ is formed. In the case of zinc for instance, the composition of such a chromate lies theoretically between the two extremes 4 ZnO, $4CrO_3$, $K_2O$, $3H_2O$ and 3ZnO, $CrO_3$, $3H_2O$.

2. Filiform Corrosion

It is characterized by irregularly directed corrosion threads between the base material and the protective layer. The attack starts from an endangered point, e.g. slag occlusion or broken varnish skin. In the Toedt Publication, on page 87, this process is described in greater detail taking the filiform corrosion of steel as an example. Filiform corrosion also occurs in aluminum alloys.

3. Bonding Primers

These are based, by way of example, on the combination of epoxy resins with phenolic resins and are preferably cured warm. They are formed, inter alia, by the reaction of the initial epoxy product epichlorohydrin with bisphenolene. Due to terminal ethylene oxide groups it is possible to subject such resins available in various polymerization stages to cross-linking reactions, whereby additions of uric and phenolic resins are possible. These bonding primers generally contain corrosion inhibitors such as chromates. Confer also, page 664 of the Toedt Publication.

4. Polyurethane Base Lacquer

Polyurethane products. Systems of this kind are obtained by reaction between polyisocyanates and suitable partners containing hydroxyl groups, usually condensation products of polycarbonic acids with polyalcohols and they allow themselves to be changed to a very large extent. It is consequently possible to produce all the graduations of a cross-linkage and to achieve effects as is the case with the films of fatty drying oils. Confer also (1), page 664. The two components of these varnishes are mixed prior to application. Curing takes place by cross linkage.

5. Non-Cross-Linked Polyamide

Reference is made here to polyamides that consist of chain molecules (linear polyamides). These are produced by polycondensation of caprolactam. By preference, mixtures of aromatic hydrocarbons and alcohols are used as solvents.

6. Polyurethane Primer

As per point 4, but with fillers and corrosion inhibitors.

7. Environment-Compatible Lacquer-Removing Agents

These are lacquer removers which are free from both phenol and cresol, the utilization of which entails neither health risks nor necessitates expensive preventive measures aimed at keeping air and sewage water free from pollution.

8. Dyeing the Intermediate Layer

As is commonly known, a varnishing compound is dyed by means of organic or inorganic pigments or with the help of lacquer soluble organic dyes (transparent lacquer).

9. New Covering Layer, e.g. Polyurethane

See point 4, "Polyurethane Base Lacquer".

A further example of the invention may be as follows: According to the figure the material 1 exists of aluminium or aluminium alloys which may be yellow chromatized.

Layer 2 is a primary layer of polyurethane containing hydroxyl groups.

In this layer the binding agent consists of polyester or polyether with free hydroxyl groups.

The hardener consists of polyisocyanate which crosslinks with the binding agents through addition reactions.

A mixture of benzol hydrocarbons and ester serves as solvent, by preferennce in a ratio of 1:1.

In addition, primary layer 2 contains fillers and corrosion inhibitors as well as chromates.

The intermediate layer 3 consists of non-cross-linked polyamide. This is produced by means of polycondensation of caprolactam. Mixtures of aromatic hydrocarbons and alochols serve as solvents.

The covering layer 4 consists of polyurethane varnish, that is to say, binding agent, hardener and solvent as with layer 2, but, if so required, dyed with pigments. Commercially available products that are free from phenol and cresol are used as lacquer remover.

The base material is not restricted to metals; it would also be possible to employ plastics, especially fiberglass-reinforced plastics.

The intermediate layer according to the invention may consist of a mixture which contains 6–14% polyamide resin and 4–12% pigments. The latter may consist of titanium dioxide.

What is claimed is:

1. A lacquer coated surface comprising a substrate, a heat cured substantially insoluble polyurethane base primer on said substrate, an intermediate layer of a non-cross-linked polyamide soluble in alcohol on said polyurethane base primer, and an external polyurethane base lacquer layer on said intermediate layer.

2. The lacquer coating according to claim 1, wherein said intermediate layer of a non-cross-linked polyamide has the characteristic of solvability in an evaporable solvent.

3. The lacquer coating according to claim 1, wherein the intermediate layer has a different color relative to the primer coat.

4. The lacquer coating according to claim 1, wherein the intermediate layer has a different color relative to the top coat.

5. The lacquer coated surface of claim 1, wherein said substrate comprises a metal having a chromatized surface, said primer being coated on said surface.

6. The lacquer coated surface of claim 1, further comprising a bonding primer between said substrate and said polyurethane base primer.

7. The lacquer coated surface of claim 6, wherein said bonding primer comprises an epoxy resin and a phenolic resin.

8. The lacquer coated surface of claim 6, wherein said bonding primer further comprises a corrosion inhibitor.

9. The lacquer coated surface of claim 1, wherein said intermediate layer comprises four to twelve percent of a pigment.

* * * * *